United States Patent
Hara et al.

(10) Patent No.: US 8,432,773 B2
(45) Date of Patent: Apr. 30, 2013

(54) THERMALLY-ASSISTED MAGNETIC HEAD HAVING BANK LAYER BETWEEN MAGNETIC POLE AND PLASMON GENERATOR

(75) Inventors: Shinji Hara, Tokyo (JP); Kosuke Tanaka, Tokyo (JP); Keita Kawamori, Tokyo (JP); Daisuke Miyauchi, Tokyo (JP); Takahiko Izawa, Tokyo (JP); Eiji Komura, Tokyo (JP)

(73) Assignee: TDK Corporation, Tokyo (JP)

( * ) Notice: Subject to any disclaimer, the term of this patent is extended or adjusted under 35 U.S.C. 154(b) by 247 days.

(21) Appl. No.: 12/962,878

(22) Filed: Dec. 8, 2010

(65) Prior Publication Data

US 2012/0147716 A1 Jun. 14, 2012

(51) Int. Cl.
*G11B 11/00* (2006.01)
(52) U.S. Cl.
USPC ..................... 369/13.33; 369/13.13
(58) Field of Classification Search ............... 369/13.33, 369/13.32, 13.13, 13.17, 112.09, 112.14, 369/112.21, 112.27, 300; 360/59; 385/129, 385/31, 88–94; 29/603.07–603.27; 250/201.3, 250/201.5
See application file for complete search history.

(56) References Cited

U.S. PATENT DOCUMENTS

| | | | |
|---|---|---|---|
| 6,470,565 B1 | 10/2002 | Sasaki | |
| 7,262,940 B2 | 8/2007 | Iwakura et al. | |
| 7,330,404 B2 | 2/2008 | Peng et al. | |
| 2008/0205202 A1 | 8/2008 | Komura et al. | |
| 2009/0073597 A1 | 3/2009 | Shiramatsu et al. | |
| 2010/0103553 A1 | 4/2010 | Shimazawa et al. | |
| 2011/0228419 A1* | 9/2011 | Tanaka et al. | 369/13.33 |
| 2011/0228420 A1* | 9/2011 | Hara et al. | 369/13.33 |
| 2011/0286128 A1* | 11/2011 | Tsutsumi et al. | 369/13.33 |
| 2011/0303637 A1* | 12/2011 | Araki et al. | 216/24 |
| 2011/0317528 A1* | 12/2011 | Miyauchi et al. | 369/13.24 |
| 2012/0020194 A1* | 1/2012 | Jin et al. | 369/13.13 |
| 2012/0026846 A1* | 2/2012 | Komura et al. | 369/13.33 |
| 2012/0075967 A1* | 3/2012 | Chou et al. | 369/13.33 |
| 2012/0082016 A1* | 4/2012 | Komura et al. | 369/13.33 |
| 2012/0120781 A1* | 5/2012 | Komura et al. | 369/13.33 |
| 2012/0188859 A1* | 7/2012 | Hara et al. | 369/13.33 |
| 2012/0230169 A1* | 9/2012 | Shimazawa et al. | 369/13.33 |

FOREIGN PATENT DOCUMENTS

JP H05-028430 A 2/1993

* cited by examiner

*Primary Examiner* — Tan X Dinh
(74) *Attorney, Agent, or Firm* — Posz Law Group, PLC

(57) ABSTRACT

A thermally-assisted magnetic head that has an air bearing surface (ABS) facing a recording medium and that performs magnetic recording while heating the recording medium includes: a magnetic recording element that includes a pole of which an edge part is positioned on the ABS and which generates magnetic flux traveling to the recording medium; a waveguide that is configured with a core through which light propagates and a cladding, surrounding a periphery of the core, at least one part of which extends to the ABS; a plasmon generator that faces a part of the core and that extends toward the ABS side; and a bank layer that is positioned between the plasmon generator and the pole, and of which an edge part on the ABS side protrudes relative to the plasmon generator.

10 Claims, 13 Drawing Sheets

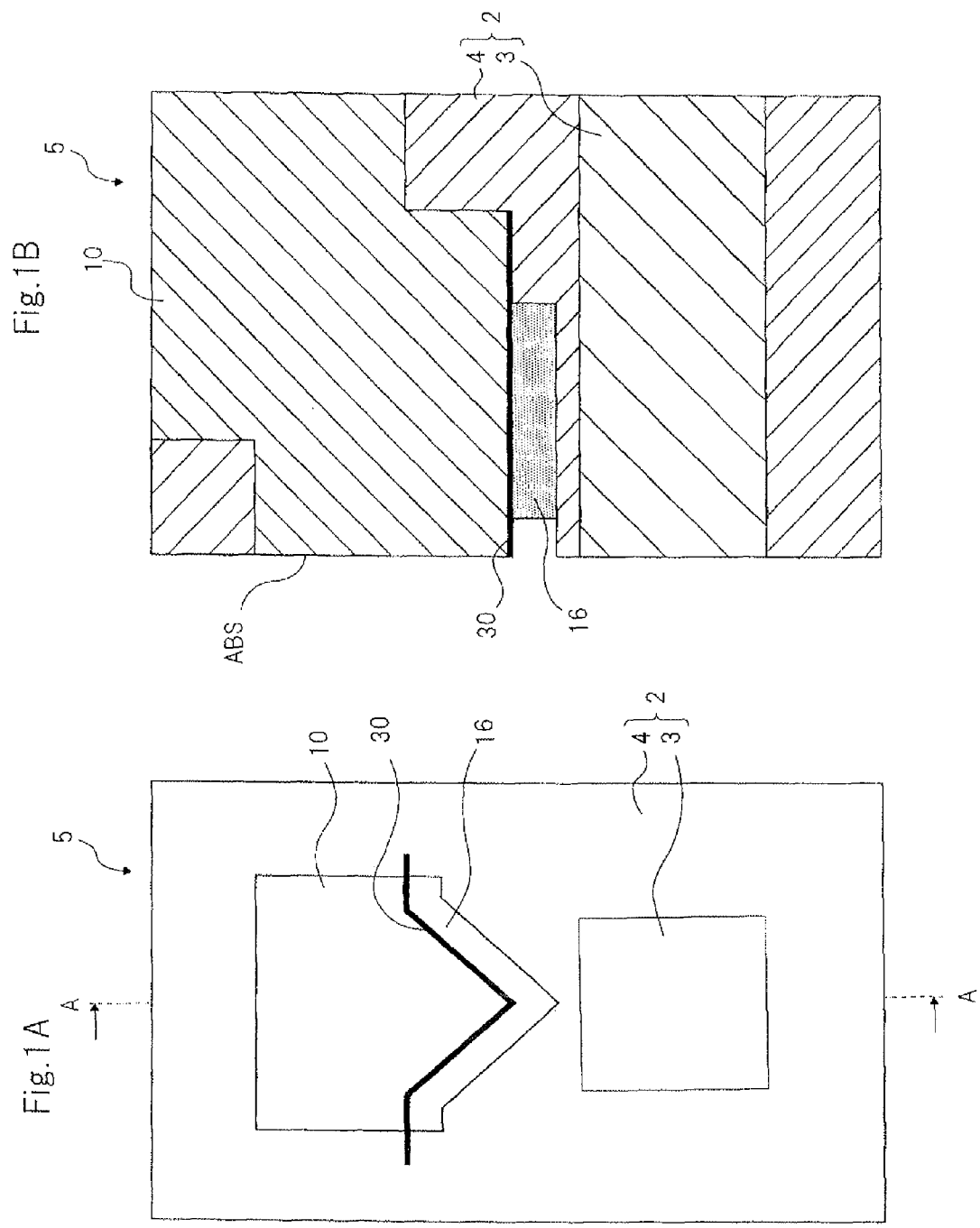

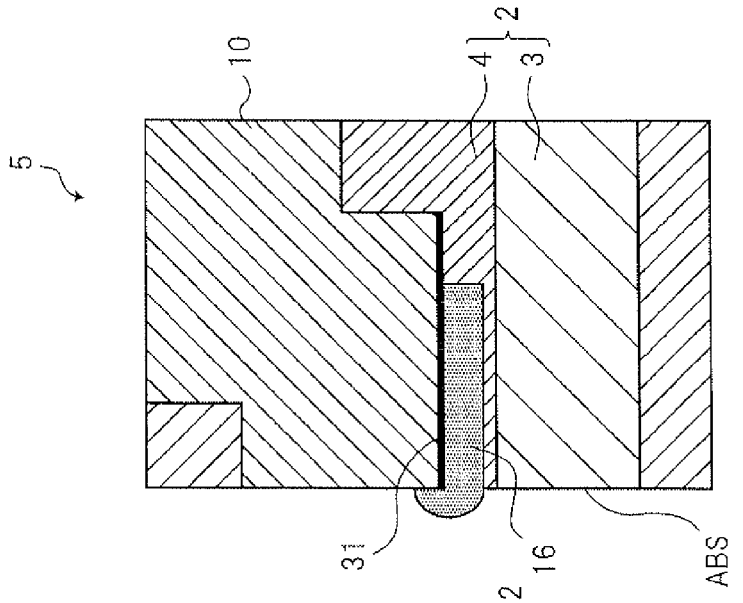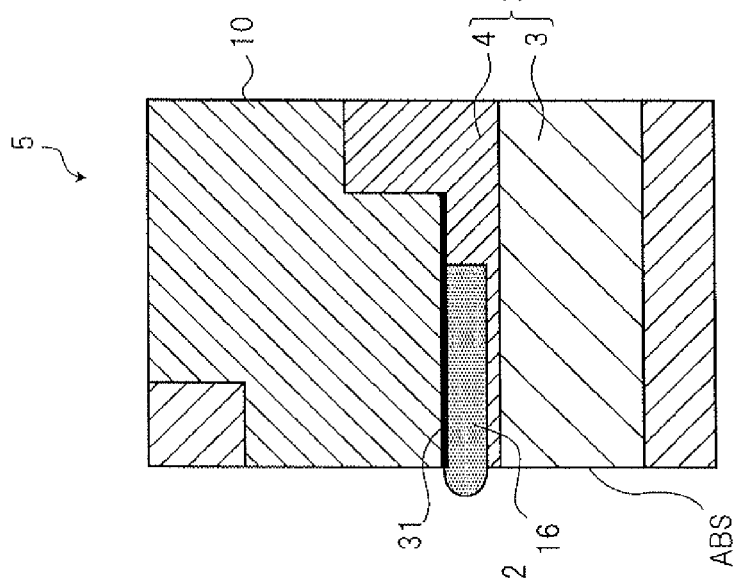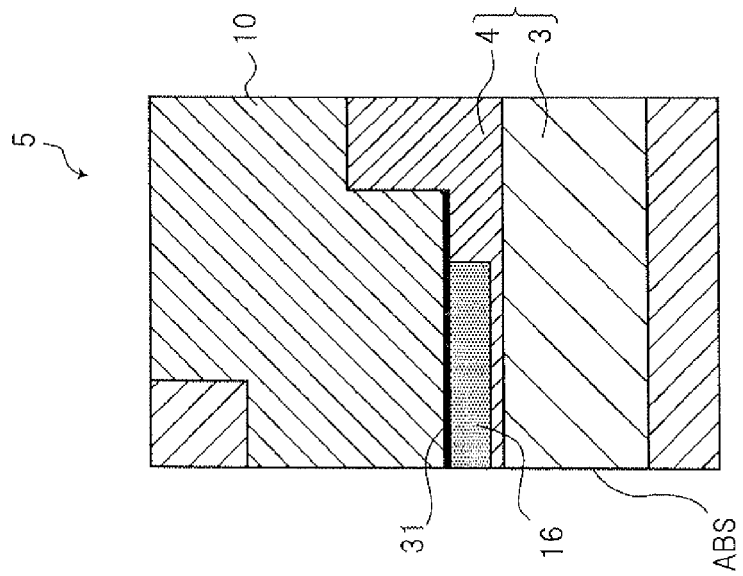

protruding length of bank layer relative to plasmon generator (nm)

THERMALLY-ASSISTED MAGNETIC HEAD HAVING BANK LAYER BETWEEN MAGNETIC POLE AND PLASMON GENERATOR

BACKGROUND OF THE INVENTION

1. Field of the Invention

The present invention relates to a thermally-assisted magnetic head that records information while heating a magnetic recording medium to reduce coercive force of the magnetic recording medium.

2. Description of the Related Art

In recent years, for magnetic recording devices such as magnetic disk devices, etc., performance improvements of a magnetic head and a magnetic recording medium are demanded in accordance with high recording density. As the magnetic head, a composite-type magnetic head is widely used in which a reproducing head that has a magneto resistive effect element (MR element) for reading and a magnetic recording head that has an inductive-type electromagnetic transducer (a magnetic recording element) for writing are laminated on a substrate. In the magnetic disk devices, the magnetic head flies slightly above a surface of the magnetic recording medium.

The magnetic recording medium is a discontinuous medium on which magnetic microparticles gather. Each of the magnetic microparticles has a single magnetic domain structure. Of the magnetic recording medium, one recording bit is configured with a plurality of the magnetic microparticles. In order to increase the recording density, the asperity of a boundary of adjacent recording bits needs to be small. For this, the size of the magnetic microparticles needs to be small. However, when the size of the magnetic microparticles is small, thermal stability of the magnetization of the magnetic microparticles is also decreased due to the decrease in the volume of the magnetic microparticles. In order to solve this problem, increasing the anisotropy energy of the magnetic microparticles is effective. However, when the anisotropy energy of the magnetic microparticles is increased, the coercive force of the magnetic recording medium is also increased. As a result, it becomes difficult to record information using a conventional magnetic recording head. The conventional magnetic recording head has such a drawback, and this is a large obstacle to achieving an increase in the recording density.

As a method to solve this problem, a so-called thermally-assisted magnetic recording method has been proposed. In this method, a magnetic recording medium that has large coercive force is utilized. The magnetic field and heat are simultaneously applied to a portion of the magnetic recording medium to which information is recorded at the time of recording the information. Using this method, the information is recorded under a state where the temperature is increased and the coercive force is decreased in the information recording portion.

For thermally-assisted magnetic recording, a method in which a laser light source is utilized to heat the magnetic recording medium is common. Such a method has two types of methods: one method is to heat the magnetic recording medium by guiding laser light to a recording portion via a waveguide, etc. (a direct heating type); and the other method is to heat the magnetic recording medium by converting laser light to near-field light (a near-field light heating type). Near-field light is a type of electromagnetic field that is formed around a substance. Ordinary light cannot be tapered to a smaller region than its wavelength due to diffraction limitations. However, when light having an identical wavelength is irradiated onto a microstructure, near-field light that depends on the scale of the microstructure is generated, enabling the light to be tapered to a minimal region being approximately tens of nm in size. Since the thermally-assisted recording targets recording density region that requires selective heating only to the minimal region being approximately tens of nm, the near-field light heating type is preferred.

In U.S. Patent Application Publication No. 2008/205202, a configuration is disclosed in which a near-field-generator is disposed in a front part of a core of a waveguide through which light from a laser diode (LD) propagates.

As a concrete method for generating the near-field light, a method using a so-called plasmon antenna, which is a metal referred to as a near-field light probe that generates near-field light from light-excited plasmon, is common.

Direct irradiation of light generates the near-field light in the plasmon antenna; however, conversion efficiency of converting irradiated light into the near-field light is low with this method. Most of the energy of the light irradiated on the plasmon antenna reflects off the surface of the plasmon antenna or is converted into thermal energy. The size of the plasmon antenna is set to the wavelength of the light or less, so that the volume of the plasmon antenna is small. Accordingly, the temperature increase in the plasmon antenna due to that the light energy is converted into the thermal energy is significantly large.

The temperature increase causes volume expansion of the plasmon antenna, and the plasmon antenna protrudes from an air bearing surface (ABS) that is a surface facing the magnetic recording medium. Then, the distance between an edge part of the MR element on the ABS and the magnetic recording medium increases, causing a problem that servo signals recorded on the magnetic recording medium cannot be read during the recording process. Moreover, when the heat generation is large, the plasmon antenna may melt.

Currently, a technology is proposed in which light is not directly irradiated onto the plasmon antenna. For example, U.S. Pat. No. 7,330,404 discloses such a technology. In this technology, light propagating through a waveguide such as an optical fiber, etc. is not directly irradiated onto the plasmon antenna; however the light is coupled with a plasmon generator in a surface plasmon mode via a buffer portion to excite a surface plasmon in the plasmon generator. The plasmon generator includes a near-field-generator that is positioned on the ABS and that generates the near-field light. At the interface between the waveguide and the buffer portion, the light propagating through the waveguide completely reflects off, and light, which is referred to as evanescent light, is simultaneously generated that penetrates into the buffer portion. The evanescent light and a collective oscillation of charges in the plasmon generator are coupled, and the surface plasmon is then excited in the plasmon generator. The excited surface plasmon propagates to the near-field-generator along the plasmon generator, and then generates near-field light in the near-field-generator. According to this technology, since the light propagating through the waveguide is not directly irradiated to the plasmon generator, an excessive temperature increase of the plasmon generator is prevented.

U.S. Patent Application Publication No. 2010/103553 discloses a configuration in which a propagation edge is disposed in a plasmon generator that couples to light in a surface plasmon mode. The propagation edge that is an extremely narrow region is for propagating a surface plasmon generated in a plasmon generator to a near-field-generator positioned on an ABS.

In the thermally-assisted magnetic head that generates near-field light using evanescent light, a distance between a pole of an inductive-type electromagnetic transducer (magnetic recording element) for writing and a plasmon generator should be reduced to the extent possible to achieve high recording density. To achieve this, a configuration may be considered in which a dielectric body layer does not exist between the pole and the plasmon generator. However, with such a configuration, corrosion (oxidation) of the pole occurs due to contact and an electrical short between the pole and the plasmon generator. The pole loses its properties as a magnetic material when the pole is corroded, and thus the function of the magnetic recording element deteriorates.

U.S. Pat. No. 7,262,940 discloses a configuration in which an insulation film is disposed between a reproducing element and a recording element to separate them in order to suppress thermal deformation of the reproducing element in a magnetic head without thermal-assistance function. Similarly, JP Patent Application Publication No. H5-28430 discloses a configuration in which a pole is disposed in a recessed position relative to an alumina protecting film from an ABS in order to prevent a magnetic head from contacting the magnetic recording medium due to heat expansion of a pole of a magnetic recording element. U.S. Pat. No. 6,470,565 discloses a configuration in which a recession length (gap) of a magnetic head from other parts of a slider on an ABS is reduced. Since these magnetic heads are not configured for thermally-assisted magnetic recording, these configurations are not directed to suppress corrosion of the pole due to the contact of the plasmon generator and the pole of the magnetic recording element.

U.S. Patent Application Publication No. 2009/073597 discloses a configuration in which a heat dissipation film made of a material having a large thermal conductivity is disposed in the vicinity of a pole of a recording element. Additionally, the heat dissipation film is neither for preventing contact of the pole and a plasmon generator nor for preventing corrosion of the pole.

SUMMARY OF THE INVENTION

It is an object of the present invention to provide a thermally-assisted magnetic head that can suppress corrosion of a pole due to contact of a plasmon generator and the pole of a magnetic recording element.

A thermally-assisted magnetic head that has an ABS facing a recording medium and that performs magnetic recording while heating the recording medium includes: a magnetic recording element that includes a pole of which an edge part is positioned on the ABS and which generates magnetic flux traveling to the recording medium; a waveguide that is configured with a core through which light propagates and a cladding, surrounding a periphery of the core, at least one part of which extends to the ABS; a plasmon generator that faces a part of the core and that extends toward the ABS side; and a bank layer that is positioned between the plasmon generator and the pole, and of which an edge part on the ABS side protrudes relative to the plasmon generator.

With the configuration, even when the plasmon generator is expanded, the plasmon generator cannot extend over the bank layer, or contact the pole. Accordingly, a corrosion of the pole is suppressed.

The above and other objects, features and advantages of the present invention will become apparent from the following description with reference to the accompanying drawings which illustrate examples of the present invention.

BRIEF DESCRIPTION OF THE DRAWINGS

FIG. 1A is a schematic view of an ABS of a thermally-assisted magnetic head of a first embodiment of the present invention;

FIG. 1B is a schematic cross-sectional view of the thermally-assisted magnetic head illustrated in FIG. 1A, cut along line A-A of FIG. 1A;

FIGS. 2A-2C are schematic cross-sectional views for explaining heat expansion of a plasmon generator of the thermally-assisted magnetic head;

DESCRIPTION OF THE PREFERRED EMBODIMENT

Figure 3:
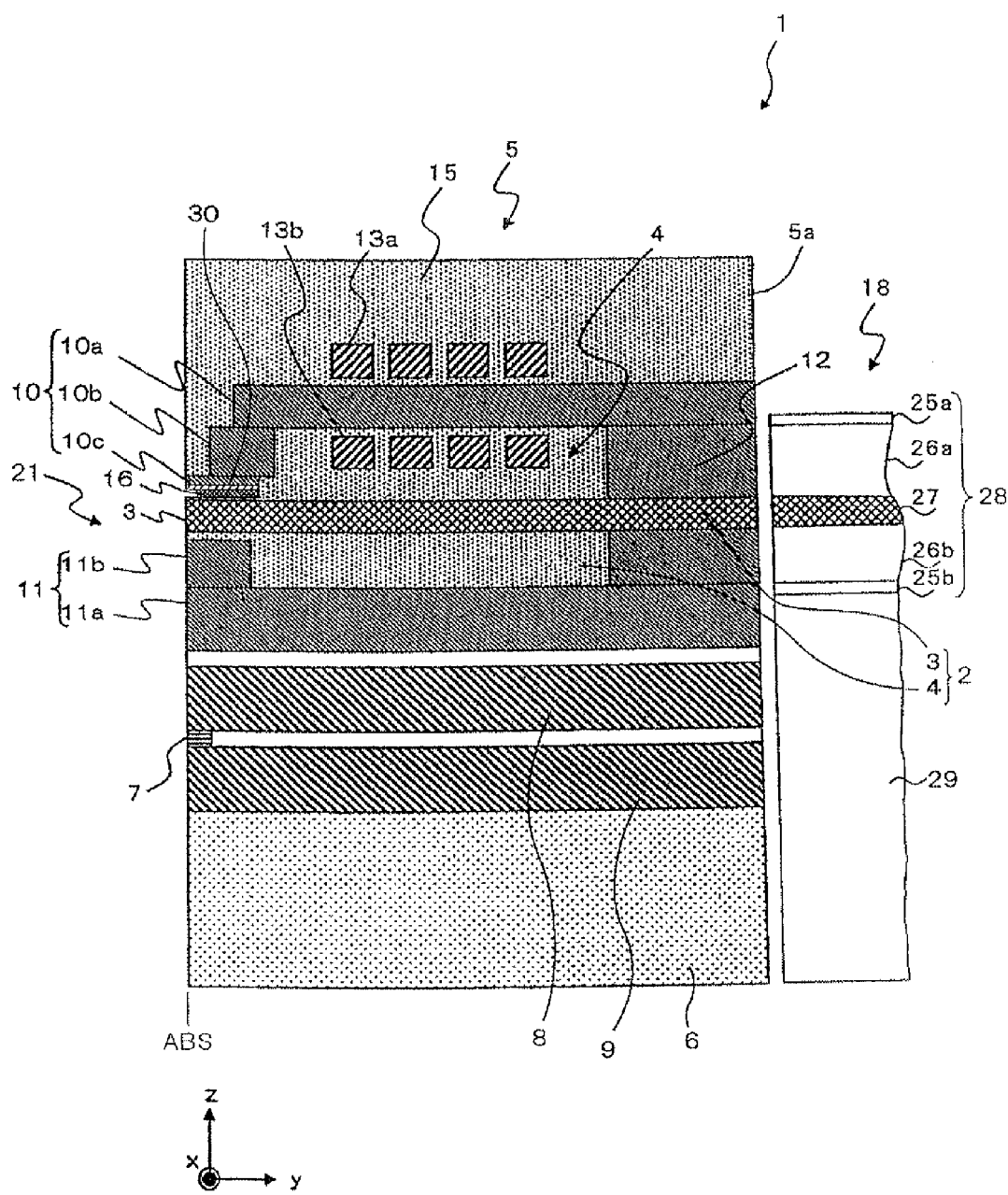
FIG. 3 is a cross-sectional view illustrating the details of a main part of the thermally-assisted magnetic head illustrated in FIGS. 1A and 1B.

A thermally-assisted magnetic head of the present invention will be explained referring to the drawings.

[First Embodiment]

First, a basic configuration of a thermally-assisted magnetic head of the present invention will be explained. The thermally-assisted magnetic head performs so-called thermally-assisted magnetic recording in which information is recorded by application of a magnetic field when coercive force is partially reduced by heating a magnetic recording medium.

As illustrated schematically in FIGS. 1A and 1B, a slider 5 of a thermally-assisted magnetic head 1 includes a magnetic recording element 21 and a waveguide 2. The magnetic recording element 21 configures a recording head part, and the waveguide 2 into which laser light used for heating the magnetic recording medium enters. The waveguide 2 is configured with a core 3 and a cladding 4 surrounding the periphery of the core 3. In the slider 5 of the thermally-assisted magnetic head 1, a plasmon generator 16 couples to propagation light entering into and propagating through the core 3 in a surface plasmon mode, and a surface plasmon is generated. The generated surface plasmon propagates toward an ABS, and near-field light is generated at a near-field-generator positioned at an edge part of the plasmon generator 16 on the ABS side. While the magnetic recording medium is locally heated by the near-field light converted from the laser light as described above, magnetic flux that travels to the magnetic recording medium is generated in a pole 10 of the magnetic recording element 21, and thereby magnetic information is recorded. A bank layer 30 made of an insulator is disposed between the pole 10 of the magnetic recording element 21 and the plasmon generator 16 through which the laser light propagates in the thermally-assisted magnetic head 1 of the present invention. The bank layer 30 protrudes toward the magnetic recording medium side relative to the plasmon generator 16 on the ABS. As illustrated in FIGS. 1A and 1B, the bank layer 30 relatively protrudes because the plasmon generator 16 is recessed from the ABS in the present embodiment. A protruding length of the bank layer 30 relative to the plasmon generator 16 (recession length of the plasmon generator 16) is from 0 nm (exclusive) to 5 nm (inclusive), and a thickness thereof is 1 nm or less.

The technical significance of the bank layer 30 will be explained. In the thermally-assisted magnetic head 1, magnetic information is written by simultaneously applying heat and magnetic flux to the same portion of the magnetic recording medium. Therefore, when the plasmon generator 16 and the pole 10 of the magnetic recording element 21 are disposed closely to the extent possible, this provides high space efficiency and moreover contributes to realize high recording density. The plasmon generator 16 is for heating, and the near-field-generator is disposed at the edge part of the plasmon generator 16 on the ABS side. In order to achieve this, a configuration is considered in which a dielectric body layer is not disposed between the pole and the plasmon generator.

However, corrosion (oxidation) of the pole occurs with such a configuration. It is considered that the main reason why the corrosion of the pole occurs may be a difference of electrode potential, which is generated due to a direct contact between a magnetic element (for example, Fe, Co, Ni) which is a base metal and a material (for example Au, Ag, Cu or the like) which is a noble metal and which configures the plasmon generator 16. Table 1 illustrates standard electrode potential of representative metals.

TABLE 1

| | | | | | |
|---|---|---|---|---|---|
| $Li^+ + e^- \Leftrightarrow Li$ | −3.040 | $Ti^{2+} + 2e^- \Leftrightarrow Ti$ | −1.630 | $Pb^{2+} + 2e^- \Leftrightarrow Pb$ | −0.126 |
| $K^+ + e^- \Leftrightarrow K$ | −2.925 | $Zr^{4+} + 4e^- \Leftrightarrow Zr$ | −1.550 | $2H^+ + 2e^- \Leftrightarrow H_2$ | 0.000 |
| $Rb^+ + e^- \Leftrightarrow Rb$ | −2.924 | $Mn^{2+} + 2e^- \Leftrightarrow Mn$ | −1.180 | $Cu^{2+} + 2e^- \Leftrightarrow Cu$ | 0.337 |
| $Ba^{2+} + 2e^- \Leftrightarrow Ba$ | −2.920 | $Zn^{2+} + 2e^- \Leftrightarrow Zn$ | −0.763 | $Cu^+ + e^- \Leftrightarrow Cu$ | 0.520 |
| $Sr^{2+} + 2e^- \Leftrightarrow Sr$ | −2.890 | $Cr^{3+} + 3e^- \Leftrightarrow Cr$ | −0.740 | $Hg_2^{2+} + 2e^- \Leftrightarrow 2Hg$ | 0.796 |
| $Ca^{2+} + 2e^- \Leftrightarrow Ca$ | −2.840 | $Fe^{2+} + 2e^- \Leftrightarrow Fe$ | −0.440 | $Ag^+ + e^- \Leftrightarrow Ag$ | 0.799 |
| $Na^+ + e^- \Leftrightarrow Na$ | −2.714 | $Cd^{2+} + 2e^- \Leftrightarrow Cd$ | −0.403 | $Hg^{2+} + 2e^- \Leftrightarrow Hg$ | 0.850 |
| $Mg^{2+} + 2e^- \Leftrightarrow Mg$ | −2.356 | $Co^{2+} + 2e^- \Leftrightarrow Co$ | −0.277 | $Pt^{2+} + 2e^- \Leftrightarrow Pt$ | 1.188 |
| $Al^{3+} + 3e^- \Leftrightarrow Al$ | −1.676 | $Ni^{2+} + 2e^- \Leftrightarrow Ni$ | −0.257 | $Au^{3+} + 3e^- \Leftrightarrow Au$ | 1.520 |
| $U^{3+} + 3e^- \Leftrightarrow U$ | −1.660 | $Sn^{2+} + 2e^- \Leftrightarrow Sn$ | −0.138 | $Au^+ + e^- \Leftrightarrow Au$ | 1.830 |

In addition, the standard electrode potential is a value of electrode potential at a standard state (25° C., 1 atm) based on electrode potential (1.0) of standard hydrogen electrode (SHE). Usually, when two or more metals are joined, the metal having a small standard electrode potential (base metal) is corroded prior to the metal having a large standard electrode potential (noble metal).

In order to electrically separate two or more of the metals and prevent corrosion, an insulation layer may be disposed between the metals. However, it is desired to reduce a distance between the pole 10 and the plasmon generator 16 to the extent possible in the thermally-assisted magnetic head in order to achieve high recording density as described above. One of the configurations in which the distance between the pole 10 and the plasmon generator 16 is reduced is a configuration in which the plasmon generator 16 is a V-shaped plasmon generator that protrudes toward the core 3 on the ABS, and the pole 10 has a reverse-triangle shaped portion along the plasmon generator 16 on at least a portion on the plasmon generator 16 side on the ABS (see FIG. 1A).

As illustrated in FIG. 2A, in a configuration in which a thin insulation layer 31 (may be made of the same material as the cladding 4 as one example) is disposed between the pole 10 and the plasmon generator 16, the plasmon generator 16, which faces the core 3 into which laser light enters, selectively protrudes due to heat expansion (see FIG. 2B), extends over the insulation layer 31 on the ABS and goes around, and contacts the pole 10, which may cause an electrical short (see FIG. 2C). As a result, corrosion of the pole 10 occurs, resulting in a decrease in output of the thermally-assisted magnetic head.

In the present invention, the bank layer 30 is disposed between the plasmon generator 16 and the pole 10, and the bank layer 30 protrudes toward the ABS side relative to the plasmon generator 16. Even when heat expansion of the plasmon generator 16, which contributes to the generation of near-field light and itself is likely to be heated, occurs, the heat-expanded plasmon generator does not extend over the bank layer 30 on the ABS, so that there is no possibility that it contacts the pole 10. Accordingly, as well as contact and an electrical short between the pole 10 and the plasmon generator 16 is prevented, and the corrosion of the pole 10 is suppressed, the configuration contributes to realizing high recording density since the bank layer 30 is relatively thinned.

Figure 4:
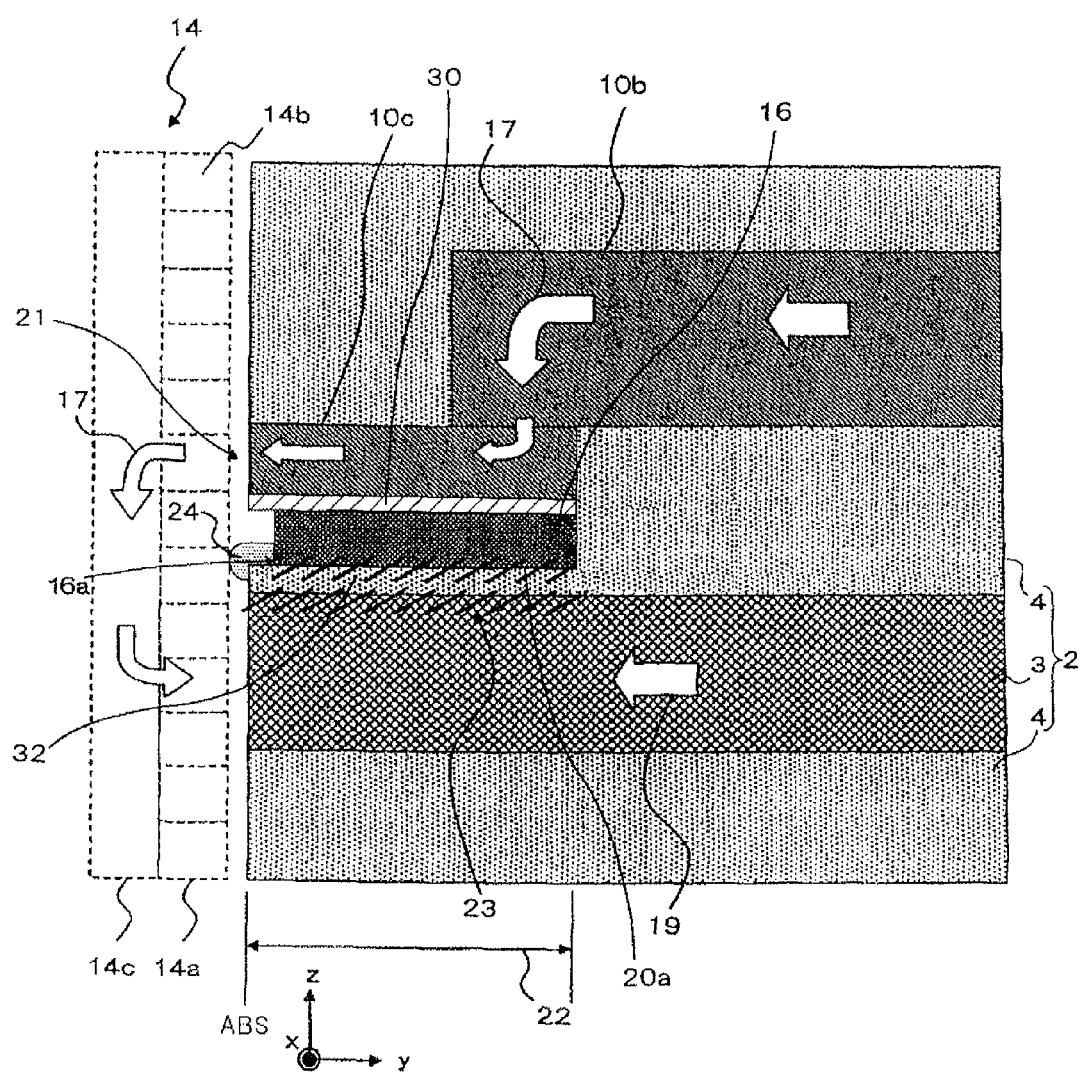
FIG. 4 is an enlarged view of the vicinity of the plasmon generator of the thermally-assisted magnetic head illustrated in FIG. 3.

Further detailed description of the above-described thermally-assisted magnetic recording head 1 of the present embodiment will be provided. FIG. 3 is a cross-sectional view illustrating a main part of the thermally-assisted magnetic head 1 illustrated in FIG. 1 in detail. FIG. 4 is an enlarged view of a part of the slider 5. As illustrated in FIG. 3, the slider 5 has a configuration in which an MR element 7 that configures a reproducing head part and a magnetic recording element 21 that is a recording head part are layered on a substrate 6 made of ALTIC ($Al_2O_3 \cdot TiC$). In the following description, a "lamination direction" indicates a film formation direction and a direction orthogonal to a film surface in a wafer formation process, and corresponds to the z-direction in each of the drawings. An "upper in the lamination direction" refers to a direction oriented toward an overcoat layer 15 from the substrate 6. A "lower in the lamination direction" refers to a direction oriented toward the substrate 6 from the overcoat layer 15.

The slider 5 includes, as the reproducing head part, the MR element 7 that has an end exposed on the ABS, and an upper shield layer 8 and a lower shield layer 9 that are disposed sandwiching the MR element 7 from the upper side and the lower side in the lamination direction. The MR element 7 may have any configuration utilizing a magneto resistive effect, such as for example a current in plane (CIP)-giant magneto resistive (GMR) element in which a sense current flows in the direction parallel to the film surface, a current perpendicular to plane (CPP)-giant magneto resistive (GMR) element in which a sense current flows in the direction perpendicular to the film surface (the lamination direction), or a tunneling magneto resistive (TMR) element that utilizes a tunnel effect, or the like. When a CPP-GMR element or a TMR element is used as the MR element 7, the upper shield layer 8 and the lower shield layer 9 are also utilized as electrodes for supplying the sense current.

The slider 5 includes the magnetic recording element 21 for a so-called perpendicular magnetic recording as the recording head part. The magnetic recording element 21 has a pole 10 for recording. The pole 10 has a first body part 10a, a second body part 10b, and a pole tip part 10c, all of which are formed of, for example, an alloy made of any two or three of Ni, Fe, and Co. A return shield layer 11 is disposed lower than the pole 10 in the lamination direction. The return shield layer 11 has a first body part 11a and a second body part 11b, both of which are also formed of an alloy made, for example, of any two or three of Ni, Fe and Co. The pole 10 and the return shield layer 11 are magnetically linked with each other via a contact part 12. In the present embodiment, the return shield layer 11 is disposed lower than the pole 10 in the lamination direction; however, it may be also disposed upper than the pole 10 in the lamination direction. The overcoat layer 15, made of $Al_2O_3$, is disposed upper than the pole 10 in the lamination direction.

Coils 13a and 13b are wound around the pole 10 being centered on the contact part 12. Magnetic flux is generated at the pole 10 by a current applied to the coils 13a and 13b from the outside. The coils 13a and 13b are formed of a conductive material such as Cu, etc. The coils 13a and 13b in the present embodiment are disposed in a two-layer manner; however one layer or three or more layers are also practical. Furthermore, the number of windings is four in the present embodiment; however the number is not limited to four.

The pole 10 is tapered at the pole tip part 10c in the vicinity of the ABS not only in the direction orthogonal to a film surface (the z-direction) but also in a cross track direction (the x-direction). Magnetic flux 17 generated in the pole 10 is tapered as it travels toward the ABS, and the minute and strong magnetic flux 17 for writing, which is suitable for high recording density, is discharged toward the magnetic recording medium 14 from the pole tip part 10c positioned on the ABS. The magnetic recording medium 14 has a configuration for perpendicular magnetic recording. A surface layer of the magnetic recording medium 14 is a recording layer 14a. The magnetic flux 17 discharged from the pole tip part 10c travels through the recording layer 14a in the perpendicular direction (the y-direction), and magnetizes each recording bit 14b of the recording layer 14a in the perpendicular direction. After the magnetic flux 17 passes through the recording layer 14a, the magnetic path of the magnetic flux 17 turns in an in-plane direction (the z-direction) of the magnetic recording medium 14 in an under layer 14c underneath made from a soft magnetic body. Furthermore, the direction of the magnetic flux 17 changes to the perpendicular direction (the y-direction) again in the vicinity of the return shield layer 11, and the magnetic flux 17 is absorbed by the return shield layer 11. In other words, the return shield layer 11, illustrated in FIG. 3, functions to control the magnetic flux 17 such that the magnetic flux 17 passes perpendicularly through the recording layer 14a and creates the U-shaped magnetic path.

In the pole 10 of the present embodiment, at least a portion that contacts the bank layer 30 has a reverse-triangle shaped portion along the plasmon generator 16 and the bank layer 30 on the ABS Furthermore, the second body part 11b of the return shield layer 11 forms a trailing shield part whose layer cross section is wider in the cross track direction (the x-direction) than the first body part 11a. The placement of such a return shield layer 11 causes a steeper gradient of the magnetic field between the return shield layer 11 and the pole 10 in the vicinity of the ABS. As a result, signal output jitter is reduced and an error rate at the time of reading is decreased.

The waveguide 2 and the plasmon generator 16 are disposed between the pole 10 and the return shield layer 11. The waveguide 2 is configured with the core 3 and the cladding 4 surrounding the core 3. The core 3 has a higher refractive index than the cladding 4. Laser light 19 (see FIG. 4), entering from an LD 28 into the core 3, is tapered by a spot size converter that is a tapered shape part of the core 3 while reflecting completely off the interface with the cladding 4, and propagates toward the ABS. The cladding 4 is formed of, for example, $AlO_x$. The core 3 is formed of, for example, $TaO_x$. Herein, $AlO_x$ indicates aluminum oxide of arbitrary composition, and $Al_2O_3$ is typical; however, $AlO_x$ is not limited to this. Similarly, $TaO_x$ indicates tantalum oxide of arbitrary composition, and $Ta_2O_5$, TaO, $TaO_2$, etc. are typical; however, $TaO_x$ is not limited to these. In order to connect to the LD 28, the core 3 extends from the ABS to a back surface 5a of the slider 5. In addition, although not illustrated in the drawings, the cladding 4 exists between the core 3 and the contact part 12 as well.

The plasmon generator 16 is positioned away from the substrate 6, and extends to the ABS facing a part of the core 3. The plasmon generator 16 is formed of Au, Ag, Cu or the like. The bank layer 30, made of an insulator protruding toward the ABS side relative to the plasmon generator 16, is disposed between the plasmon generator 16 and the pole 10. The bank layer 30 of the present embodiment is configured in a V-shape along the plasmon generator 16 on the ABS and a cross section parallel thereto.

Herein, a description of the plasmon generator 16 will be given. The plasmon generator 16 in the present embodiment is a V-shaped metallic piece that protrudes toward the core 3 on the ABS and the cross sections parallel thereto as illustrated in FIG. 1A. An apex, facing the core 3, of the V-shaped plasmon generator 16 configures a propagation edge 20a extending in a longitudinal direction (the y-direction) of the plasmon generator 16. A buffer portion 32 is a portion sandwiched by the core 3 and a bottom surface including the propagation edge 20a of the plasmon generator 16. In other words, the propagation edge 20a is covered by the buffer portion 32. The buffer portion 32 functions to couple the propagation light propagating through the core 3 with the plasmon generator 16 in the surface plasmon mode. The near-field-generator 16a is formed at an edge part on the ABS of the propagation edge 20a.

Because of such a configuration, as illustrated in FIG. 4, the plasmon generator 16, at the overlapping part 22 where the propagation edge 20a overlaps the core 3 and due to the function of the buffer portion 32, couples to propagation light 19 propagating through the core 3 in the surface plasmon mode, and generates a surface plasmon 23. The generated surface plasmon 23 propagates toward the ABS along the propagation edge 20a and reaches the near-field-generator 16a. Then, the propagating surface plasmon 23 generates near-field light 24 at the near-field-generator 16a.

The plasmon generator 16 extends approximately parallel to the core 3 and in a direction (y-direction) perpendicular to the ABS. As illustrated in FIGS. 3 and 4, the plasmon generator 16 does not extend to the back surface 5a of the slider 5.

As illustrated in FIG. 3, the LD 28 that is a light source is linked with the back surface (light incident surface) 5a of the slider 5. The LD 28 has a pair of electrodes 25a and 25b, a positive (P) type cladding 26a and a negative (N) type cladding 26b that are sandwiched by the electrodes 25a and 25b, and an active layer 27 positioned between both of the claddings 26a and 26b, and these cleavage surfaces are in a reflecting mirror structure. The LD 28 is mounted on an LD sub-mount 29, and is aligned properly with respect to the slider 5. The active layer 27 that continuously oscillates the laser light 19 is positioned on the same line as the core 3 of the slider 5 such that the laser light 19 generated in the active layer 27 enters into the core 3. The wavelength of the laser light 19 is not particularly limited; but laser light having a wavelength of approximately 800 nm is preferably used.

The core 3 of the waveguide 2 may have a square pillar shape extending in the same cross sectional shape; on the other hand, the core 3 of the waveguide 2 may be configured with the spot size convertor and a straight part. The spot size convertor is gradually tapered from the back surface 5a side of the slider 5, i.e., from a side of the LD 28. The straight part is positioned on the ABS side. As one example, a diameter of the propagation light 19 propagating through the core 3 is tapered when the propagation light 19 passes through the spot size converter having a length of approximately 100 μm or less, and the propagation light 19 enters into the straight part having a rectangular cross section of a width 0.4 μm×a height 0.5 μm.

When magnetic recording is performed to the magnetic recording medium 14 utilizing the thermally-assisted magnetic head 1 that is structured as above, power is supplied to a pair of the electrodes 25a and 25b of the LD 28, which are linked with the back surface 5a of the slider 5, and then the active layer 27 generates the laser light 19 and the laser light 19 enters into the core 3 facing the active layer 27. The incident laser light 19 propagates toward the ABS in the core 3 as the diameter is tapered in the spot size converter. At the overlapping part 22 overlapping with the core 3, the plasmon generator 16 couples to the propagation light 19 propagating through the core 3 in the surface plasmon mode due to the function of the buffer portion 32, and generates the surface plasmon 23. The surface plasmon 23 propagates along the propagation edge 20a of the plasmon generator 16 and reaches the near-field-generator 16a. The near-field light 24 is generated based on the surface plasmon 23 at the near-field-generator 16a. A portion (a portion to which information is recorded) of the recording layer 14a of the magnetic recording medium 14 is heated by this near-field light 24, and the coercive force is decreased. Then, simultaneously with this heating, current is applied to the coils 13a and 13b, magnetic flux is generated in the pole 10, and the information is written. Since the near-field-generator 16a that performs the heating and the pole 10 that performs the writing are closely positioned, the information is efficiently written to the portion of the recording layer 14a of the magnetic recording medium 14 where the coercive force is decreased due to the heating.

The plasmon generator 16 including the near-field-generator 16a on one edge part contributes to heat the magnetic recording medium 14, so that the plasmon generator 16 itself is likely to be heated and heat-expanded. However, with the configuration of the present embodiment, the plasmon generator 16 does not extend over the bank layer 30 on the ABS even when the plasmon generator 16 is heat-expanded as illustrated in FIG. 2C. In other words, the bank layer 30 that protrudes relative to the plasmon generator 16 blocks a progression of the plasmon generator 16 toward the pole 10 side. Therefore, an electrical short due to the contact between the pole 10 made of the base metal and the plasmon generator 16 made of the noble metal is prevented, and the corrosion of the pole 10 is suppressed.

Next, one example of a manufacturing method of the thermally-assisted magnetic head 1 of the present embodiment will be explained. Additionally, detailed explanation of each process to which a known method may be arbitrarily applied is omitted.

Initially, as illustrated in FIG. 2, the lower shield layer 9, the MR element 7 that is a reproducing element, the upper shield layer 8 and the return shield layer 11 are laminated in this order above the substrate 6 that is made of $Al_2O_3.TiC$. Additionally, in the middle of this process, insulation layers are appropriately disposed respectively between the lower shield layer 9 and the upper shield layer 8 and between the upper shield layer 8 and the return shield layer 11.

Next, the cladding 4 made of $AlO_x$ and the core 3 made of $TaO_x$ are laminated in this order, and patterning is performed. Propagation of single mode light is necessary to induce the near-field light; and a cross sectional size of the core 3 should be a wavelength of the propagation light 19 or less, although it is dependent on refractive indices of the core 3 and the cladding 4. In the present example, a patterning is performed on the core 3 such that an edge surface exposed on the ABS becomes a rectangle of width 0.4 μm×height 0.5 μm, and it is arranged such that the laser light 19 having the wavelength of 0.8 μm propagates. In the figures, the cladding 4 that is formed beforehand and the cladding 4 that is newly laminated are illustrated in an integrated manner.

The cladding 4 that is a dielectric spacer layer is formed above the core 3, and a V-shaped groove is formed on an upper surface of the cladding 4. The plasmon generator 16 made of Au is formed in the groove. The plasmon generator 16 has a V-shaped cross section that corresponds to the shape of the groove.

The bank layer 30 made of alumina is formed on the plasmon generator 16. One example of the thickness of the bank layer 30 is 2 nm.

The pole 10 is formed thereabove. A lower part of the pole 10 is formed in a reverse-triangle shaped portion along the shape of the plasmon generator 16 and the bank layer 30. In other words, the pole 10 that is configured with the reversed-triangle-shaped lower portion and a quadrangle-shaped upper portion is formed on the V-shaped plasmon generator 16 and the bank layer 30. The cladding 4 is formed surrounding the plasmon generator 16, the bank layer 30, and the pole 10. Then, the coil layers 13a and 13b and the overcoat layer 15, which are illustrated in FIG. 2, are formed.

Ion milling is performed on the slider 5 formed as described above, and an ABS facing the magnetic recording medium 14 is formed. At this point, the plasmon generator 16 is recessed from the ABS. A desired recession length of the plasmon generator (i.e., a desired protruding length of the bank layer 30) is obtained by varying conditions of the ion milling, such as, for example, composition of atmosphere gas, application voltage, performing duration, milling angle, etc., in accordance with materials of each layer including the plasmon generator 16.

Thereafter, the LD unit 18 including the LD 28 that generates laser light having a wavelength of 800 nm is attached to the slider 5 performing an alignment to link the LD 28 with the core 3 of the waveguide 2.

A writing experiment was performed with the thermally-assisted magnetic head 1 of the embodiment of the present invention, which is manufactured as described above. Specifically, thermally-assisted magnetic recording was performed to the magnetic recording medium 14 using the magnetic recording element 21, the recorded magnetic information was simultaneously reproduced by the MR element 7 that is adjacent thereto, and reproduced output was measured. Light power that is required for saturation recording and corrosion time of the pole were then determined. Additionally, the experiment was performed as a magnetic flux variation number per 1 inch (2.54 cm) was 500 kFCI and rotation speed of the magnetic recording medium was 3600 rpm.

Figure 5:
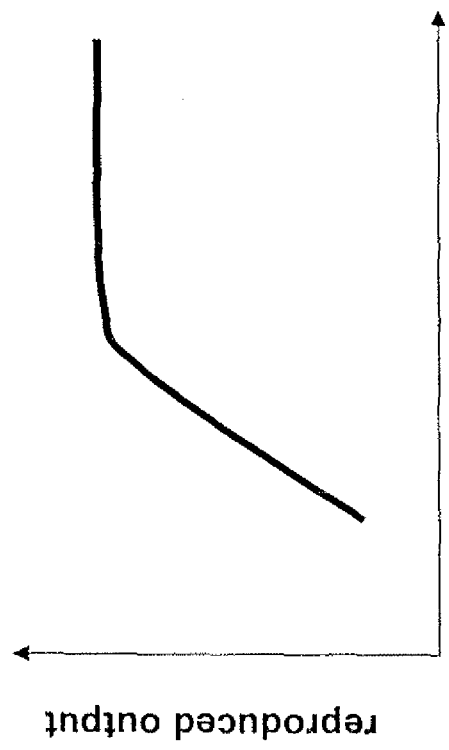
FIG. 5 is a graph illustrating a relationship between reproduced output and heat quantity for heating a medium with the thermally-assisted magnetic head.

Herein, the saturation recording will be explained. When light power of laser light that is introduced into the core 3 for the thermally-assisted magnetic recording is increased, output of the MR element 7 at the time of reading magnetic information recorded by the thermally-assisted magnetic recording is increased. When the light power of the laser light reaches a certain amount, the output of the MR element 7 at the time of reading the magnetic information becomes approximately constant, and the output does not increase further (see FIG. 5). The output of the MR element 7 at this point is referred to as a saturation output. A reason for reaching a saturation recording state will be explained. When the magnetic recording medium is not sufficiently heated, coercive force is not sufficiently reduced. As a result, a magnetization in one recording bit does not become identical to those in the others, and an even magnetization state is not provided over an entirety of the recording bit even when the same magnetic flux is applied. However, since the coercive force is sufficiently reduced when the heating is sufficient, magnetization reversal evenly occurs and the magnetizations become identical over the entirety of the recording bit. When the magnetizations are evenly identical, variation in the magnetization state does not occur even though further heating is performed, and the saturation recording state is provided. The reproduced output and heat quantity for heating the medium to reach the saturation recording have a positive correlation. Then, the heat quantity for heating the medium may be represented by power supplied to the LD 28. When the saturation recording state having a large reproduced output is accomplished with small power, this provides high energy efficiency and also an advantage that the longevity of LD 28 is increased.

Figure 6:
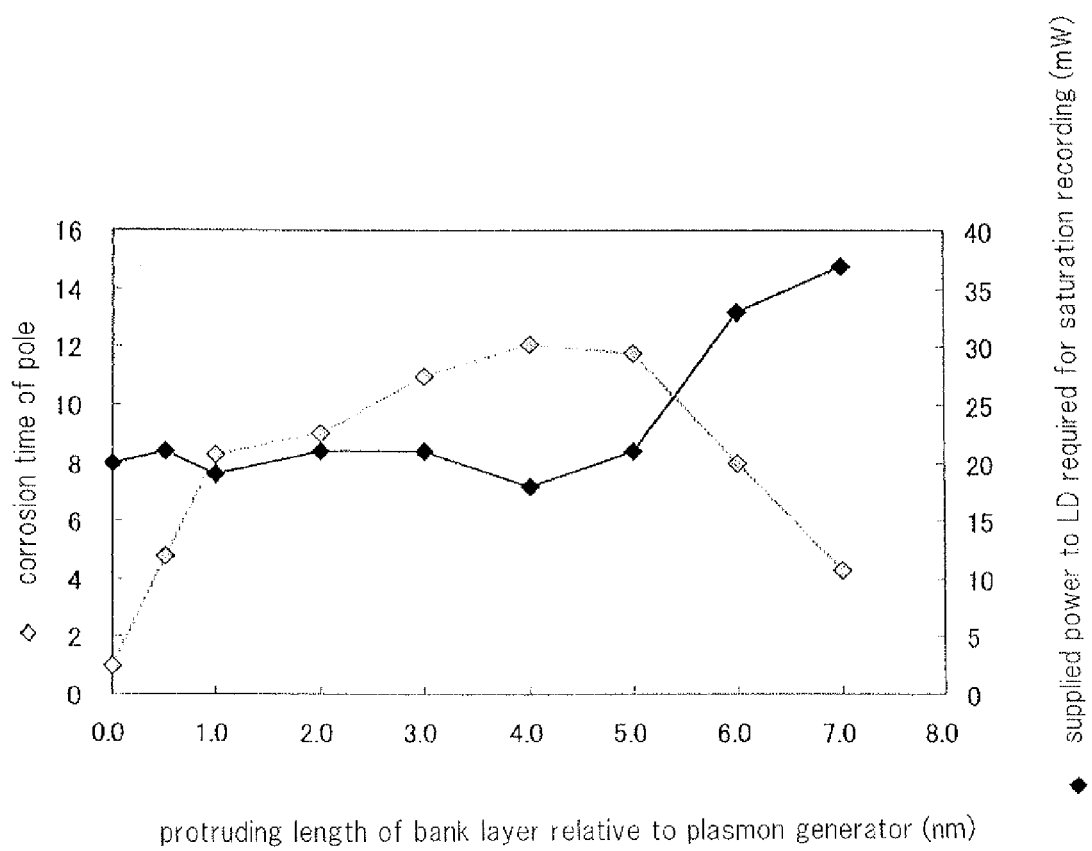
FIG. 6 is a graph illustrating relationships between protruding length of a bank layer of the thermally-assisted magnetic head illustrated in FIGS. 1A-4 relative to the plasmon generator and corrosion time of the pole and supplied power to an LD required for saturation recording.

With the above-described manufacturing method, a plurality of thermally-assisted magnetic heads 1 were manufactured, each of which had a different protruding length of the bank layer 30 relative to the plasmon generator 16, and an amount of power supplied to the LD 28 which is required to reach a corresponding saturation recording was determined, for each thermally-assisted magnetic head 1. FIG. 6 illustrates results thereof. According to FIG. 6, when the protruding length of the bank layer 30 relative to the plasmon generator 16 was 5 nm or less, the power required to reach the saturation recording was approximately constant; on the other hand, when the protruding length was 6 nm or more, the required power increased largely, which is not preferred. It is assumed that this is caused by that the plasmon generator 16 that has a small propagation loss of the surface plasmon disappears in the vicinity of the ABS, and that a propagation loss starts to emerge when a distance (the protruding length of the bank layer 30) of which an area where the bank layer 30 exists but the plasmon generator 16 does not exist extends in a direction orthogonal to the ABS is 6.0 nm or more. Therefore, from the standpoint of power required to reach the saturation recording, it is preferred that the protruding length of the bank layer 30 relative to the plasmon generator 16 is 5 nm or less.

Similarly, the present applicant manufactured a plurality of thermally-assisted magnetic heads 1, each of which had a different protruding length of the bank layer 30 relative to the plasmon generator 16, and measured time until the pole 10 corroded (corrosion time of pole). Specifically, recording of the magnetic information by the magnetic recording element 21 and reproducing by the MR element 7 were continued from a point of reaching the above-described saturation recording, without varying power supplied to the LD 28. Then, the point when the measured reproduced output was reduced by 10% was defined as "the magnetic pole 10 corroded." A continuous writing time required to corrode the pole 10, which is referred to as "corrosion time of pole," is illustrated in FIG. 6. Additionally, as shown in FIG. 6, the corrosion time of pole of each of the thermally-assisted magnetic heads 1 is described with a relative value according to that the corrosion time of pole of the thermally-assisted magnetic head 1 having 0 nm of the protruding length of the bank layer 30 relative to the plasmon generator 16 is one. Referring to FIG. 6, compared to the thermally-assisted magnetic head 1 having 0 nm of the protruding length of the bank layer 30 relative to the plasmon generator 16, the corrosion time of pole approximately quintuples when the protruding length is 0.5 nm, and the corrosion time of pole approximately decuples when the protruding length is 1-5 nm. Accordingly, when the bank layer 30 protrudes relative to the plasmon generator 16 even by just a small amount, corrosion resistance is largely improved.

When the protruding length of the bank layer 30 relative to the plasmon generator 16 is 6 nm or more, the corrosion time of pole is shortened. It is estimated that this may be due to the fact that the propagation loss starts to emerge when the protruding length of the bank layer 30 relative to the plasmon generator 16 is 6.0 nm or more as described above, heat generation in the vicinity of the ABS increases corresponding thereto, and an oxidation reaction of the pole 10 is accelerated.

[Second Embodiment]

Figure 7:
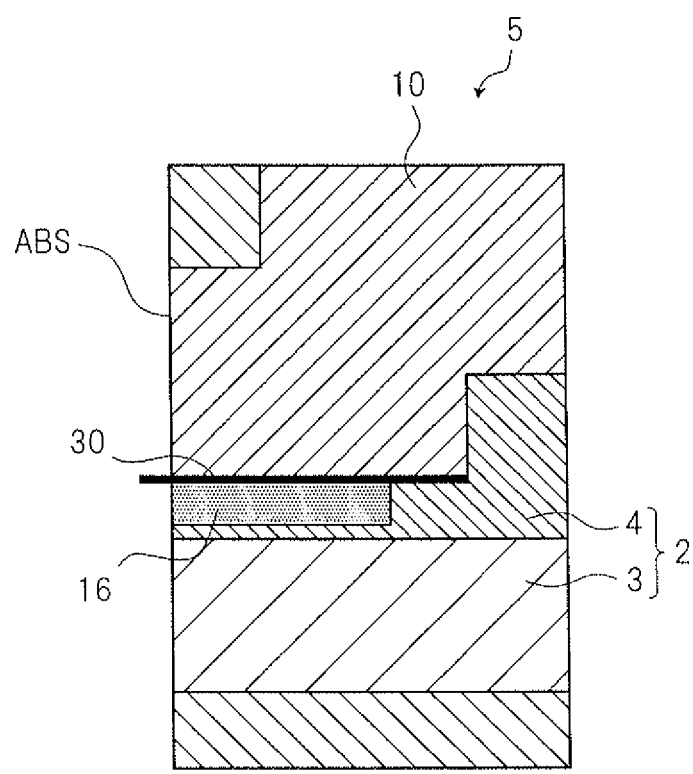
FIG. 7 is a schematic cross-sectional view of a thermally-assisted magnetic head of a second embodiment of the present invention.

FIG. 7 illustrates a thermally-assisted magnetic head 1 of a second embodiment of the present invention in which a bank layer 30 protrudes from an ABS. Similar to the first embodiment, the thermally-assisted magnetic head 1 of the second embodiment also produces effects that corrosion time of pole extends as well as power required to reach saturation recording is reduced, and that is the contribution to high recording density as well as the suppression of the pole corrosion.

The manufacturing method of the thermally-assisted magnetic head 1 of the present embodiment is substantially the same as the manufacturing method of the first embodiment. In the step of ion milling, all layers other than the bank layer 30 on the ABS are recessed, which is the only different aspect from the first embodiment in which only the plasmon generator 16 is recessed.

Figure 8:
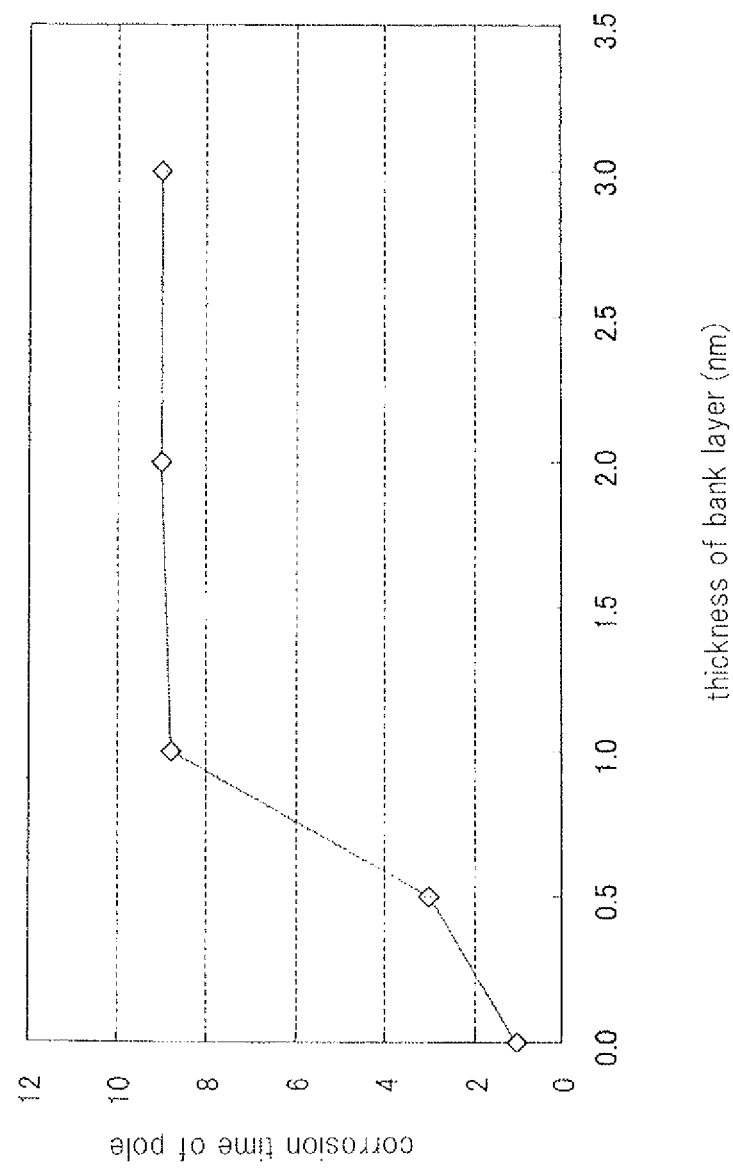
FIG. 8 is a graph illustrating a relationship between a thickness of a bank layer of the thermally-assisted magnetic head illustrated in FIG. 7 and corrosion time of a pole.

The present applicant manufactured a plurality of the thermally-assisted magnetic heads 1, each of which had a different width of the bank layer 30, performed the writing experiment which was the same as the one performed in the first embodiment, and determined corrosion time for pole. FIG. 8 illustrates results thereof. The experimental conditions were the same as described above, and the protruding length of the bank layer 30 was constantly set to 2 nm.

According to FIG. 8, it is determined that when the thickness of the bank layer 30 made of alumina is 1 nm or more, the corrosion time of pole is significantly extended, or in other words, output deterioration due to the corrosion of the pole 10 is suppressed. Only the bank layer 30 made of alumina is explained herein; however, it is estimated that a bank layer, made of a material that is generally classified as an insulator, contributes to the improvement in a corrosion resistance of the pole 10 when the thickness is approximately 1 nm or more as well.

[Third Embodiment]

Figure 9:
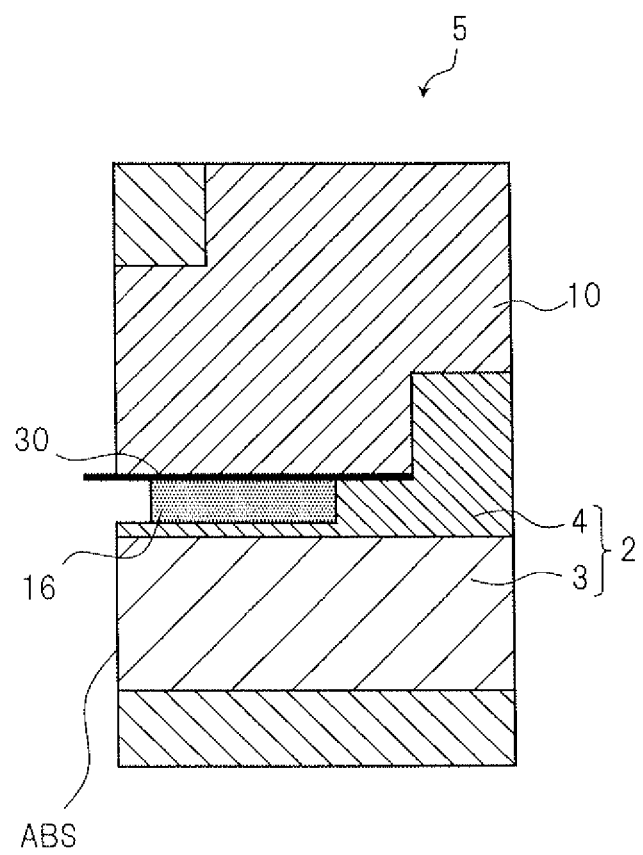
FIG. 9 is a schematic cross-sectional view of a thermally-assisted magnetic head of a third embodiment of the present invention.

FIG. 9 illustrates a thermally-assisted magnetic head 1 of a third embodiment of the present invention in which a bank layer 30 protrudes from an ABS and a plasmon generator 16 is recessed from the ABS. Similar to the first and second embodiments, the thermally-assisted magnetic head 1 of the third embodiment also produces effects that corrosion time of pole extends as well as power required to reach saturation recording is reduced, and that is the contribution to high recording density as well as the suppression of the pole corrosion.

The manufacturing method of the thermally-assisted magnetic head 1 of the present embodiment is substantially the same as the manufacturing method of the first and second embodiments. All layers other than the bank layer 30 on the ABS are recessed in the step of ion milling, and only the plasmon generator 16 is largely recessed, which are the different aspects from the first and second embodiments.

The choice of materials used for each layer determines which the thermally-assisted magnetic head 1 of either the above-described first, second or third embodiments is manufactured. Then, it is possible to vary the protruding length of the bank layer 30 by adjusting the condition of ion milling (a composition of atmosphere gas, application voltage, performing duration, milling angle, etc). Particularly, from the standpoint of suppressing the corrosion of the pole 10, it is not a serious matter which configuration is applied; the configuration in which the bank layer 30 protrudes from the ABS, the configuration in which the plasmon generator is recessed from the ABS, or a configuration incorporating both of the previously mentioned configurations. The important point is a distance between the edge part of the bank layer 30 and the edge part of the plasmon generator 16. When the distance between both of them, i.e., the protruding length of the bank layer 30 relative to the plasmon generator 16 is 0 nm (exclusive) to 5 nm (inclusive), or more preferably 1 nm (inclusive) to 5 nm (inclusive), the effect to suppress the corrosion of the pole 10 is large. This is common in all of the first, second and third embodiments. Similarly, when the thickness of the bank layer 30 is 1 nm or more, the corrosion of the pole 10 is effectively suppressed in all of the first, second and third embodiments.

As a material to the plasmon generator 16 of the thermally-assisted magnetic head 1 of the present invention, Au, Ag, Cu, Pd, Ir, Pt and a substance that is made primarily of these materials are applicable, and specifically Au, Ag, Cu are typical.

As a material to the bank layer 30, $BO_x$, $AlO_x$, MgO, $SiO_x$, $TiO_x$, $VO_x$, $CrO_x$, $MnO_x$, $FeO_x$, $CoO_x$, $NiO_x$, $ZnO_x$, $GaO_x$, $GeO_x$, $YO_x$, $ZrO_x$, $NbO_x$, $MoO_x$, $InO_x$, $SnO_x$, $SbO_x$, $HfO_x$, $TaO_x$, $BiO_x$, $CeO_x$, $NdO_x$, $SmO_x$, $GdO_x$, $TbO_x$, $DyO_x$, $YbO_x$, BN, AlN, $SiN_x$, $TiN_x$, $FeN_x$, $GaN_x$, $ZrN_x$, $TaN_x$, $WN_x$, MgF, Si, SiC, TaC, AlON, SiON, AlSiON or substances made primarily of these materials ("x" is an arbitrary number) are applicable. Specifically, $AlO_x$, MgO, $SiO_x$, $TiO_x$, $ZnO_x$, $HfO_x$, $TaO_x$, AlN, $SiN_x$, MgF, Si, SiC, TaC, AlON, SiON, AlSiON are typical.

Figure 10:
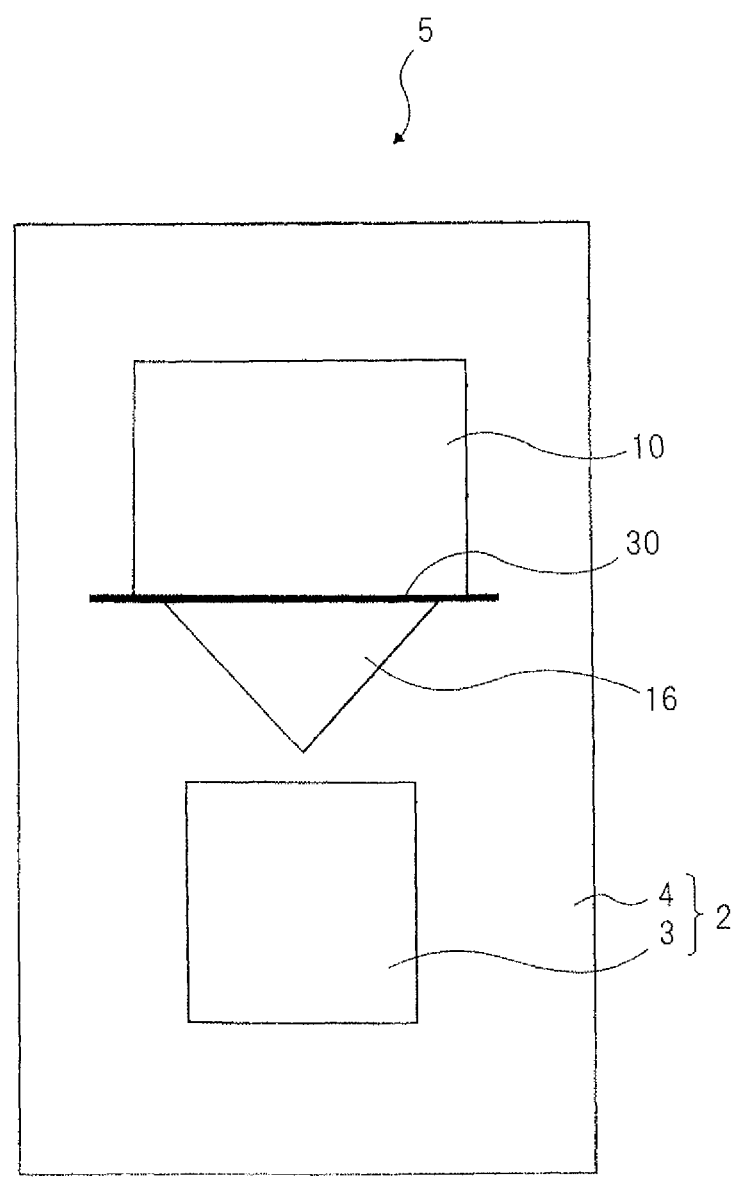
FIG. 10 is a schematic view illustrating an ABS of a modified example of the thermally-assisted magnetic head of the present invention.

As illustrated in FIG. 1A, the present invention is not limited to the configuration having the V-shaped plasmon generator 16. The present invention is also applicable to the configuration having the reverse-triangle shaped plasmon generator 16 as illustrated in FIG. 10.

Furthermore, the present invention is not limited to the thermally-assisted magnetic head 1 using evanescent light. As long as a thermally-assisted magnetic head has the plasmon generator 16 that is exposed on the ABS and that generates the near-field light and has the pole 10 close to the plasmon generator 16, the thermally-assisted magnetic head is widely applicable.

Figure 11:
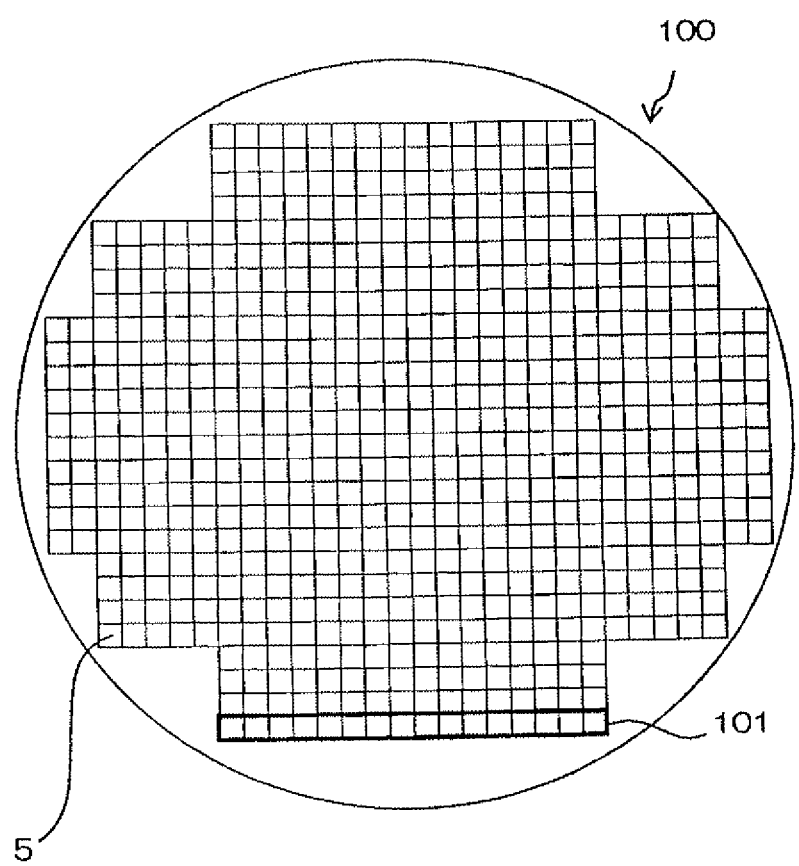
FIG. 11 is a plan view of a wafer where a large number of stacks that configure a slider of the thermally-assisted magnetic head of the present invention are formed.
Figure 12:
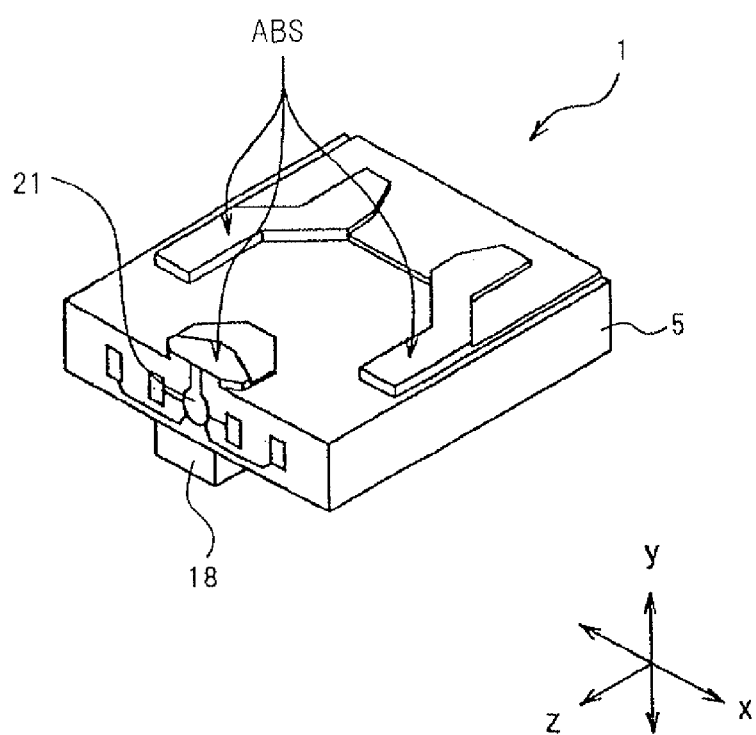
FIG. 12 is a perspective view of the thermally-assisted magnetic head of the present invention, as seen from an ABS side.

For mass-manufacturing the thermally-assisted magnetic heads 1, a plurality of stacks configuring the slider 5 are formed on a wafer 100 illustrated in FIG. 11. The wafer 100 is divided into a plurality of bars 101, which are working units for the polishing process of the ABS. The bar 101 is further cut after the polishing process and is divided into the plurality of sliders 5. Margins for cutting (not illustrated) that are for cutting the wafer 100 into the bar 101 and for cutting the bar 101 into the slider 5 are formed in the wafer 100. As illustrated in FIG. 12, each of the sliders 5 has an approximately hexahedral shape, and one surface of the six outer surfaces is the ABS facing a hard disk 14 that is a recording medium. The LD unit 18 aligned with respect to the slider 5 is attached to the slider 5, and the thermally-assisted magnetic head 1 is configured.

Figure 13:
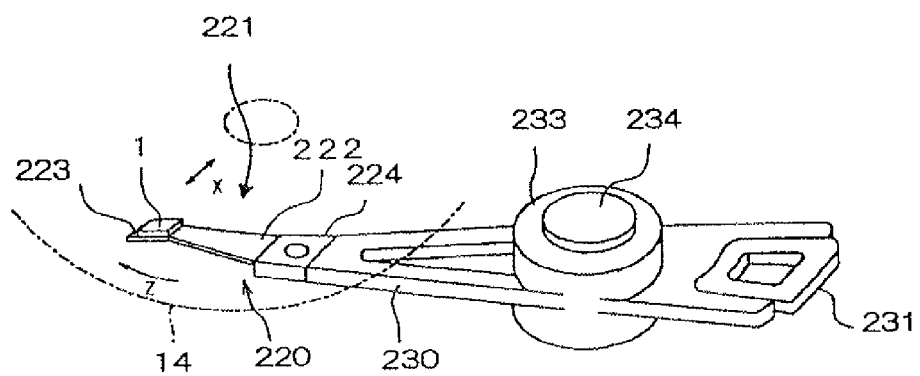
FIG. 13 is a perspective view of a head arm assembly that includes a head gimbal assembly in which the thermally-assisted magnetic head of the present invention is incorporated.

Referring to FIG. 13, a head gimbal assembly 220 includes the thermally-assisted magnetic head 1 and a suspension 221 elastically supporting the thermally-assisted magnetic head 1. The suspension 221 has a load beam 222, a flexure 223, and a base plate 224. The load beam 222 is formed in a plate spring shape and made of stainless steel. The flexure 223 is arranged in one edge part of the load beam 222. The base plate 224 is arranged in the other edge part of the load beam 222. The flexure 223 is joined to the thermally-assisted magnetic head 1 to give the thermally-assisted magnetic head 1 suitable flexibility. At the part of the flexure 223 to which the thermally-assisted magnetic head 1 is attached, a gimbal part is disposed to maintain the thermally-assisted magnetic head 1 in an appropriate orientation.

The thermally-assisted magnetic head 1 is arranged in the hard disk device such that the thermally-assisted magnetic head 1 faces the hard disk 14 which is a disk-shaped recording medium that is rotatably driven. When the hard disk 14 rotates in the z-direction of FIG. 13, air flow passing between the hard disk 14 and the thermally-assisted magnetic head 1 generates a downward lifting force in the y-direction to the thermally-assisted magnetic head 1. The thermally-assisted magnetic head 1 flies from the surface of the hard disk 14 due to the lifting force. At the edge part of the slider 5 of the thermally-assisted magnetic head 1 on the air flow exit side (a left side of FIG. 12), the magnetic recording element 21 is formed.

A part in which the head gimbal assembly 220 is mounted on an arm 230 is referred to as a head arm assembly 221. The arm 230 moves the thermally-assisted magnetic head 1 in the track crossing direction x of the hard disk 14. One edge of the arm 230 is mounted on the base plate 224. On the other edge of the arm 230, a coil 231 is mounted, which forms one part of a voice coil motor. A bearing part 233 is arranged in the middle section of the arm 230. The arm 230 is rotatably supported by a shaft 234 mounted on the bearing part 233. The arm 230 and the voice coil motor for driving the arm 230 configure an actuator.

Figure 14:
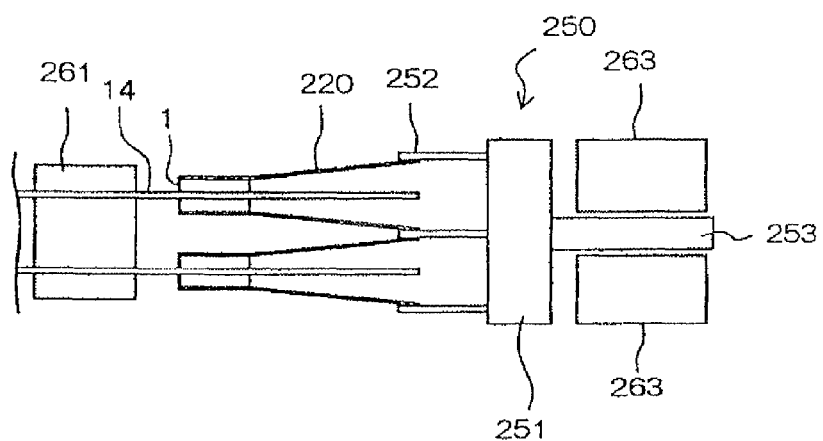
FIG. 14 is a side view of the head arm assembly in which the thermally-assisted magnetic head of the present invention is incorporated.
Figure 15:
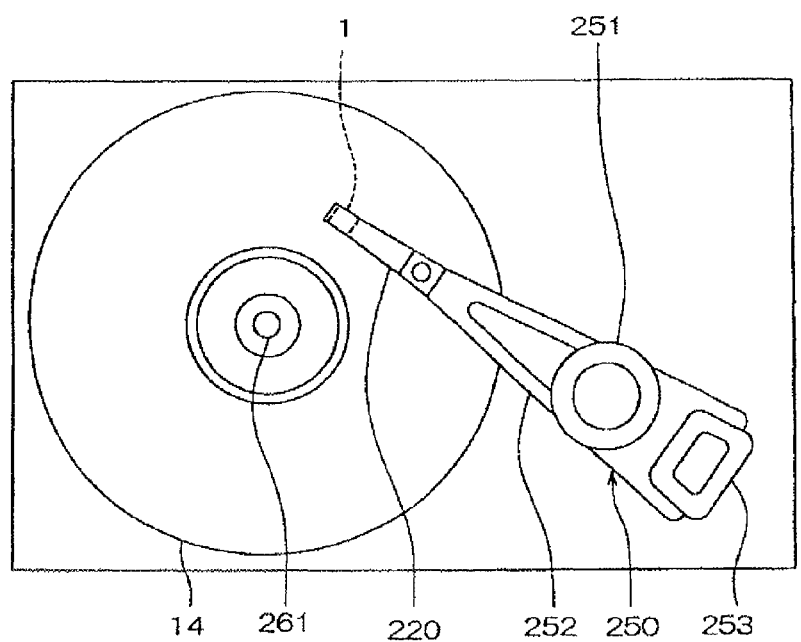
FIG. 15 is a plan view of a hard disk device in which the thermally-assisted magnetic head of the present invention is incorporated.

Next, referring to FIGS. 14 and 15, a head stack assembly in which the above-described thermally-assisted magnetic head 1 is integrated and the hard disk device will be explained. A head stack assembly refers to a component in which the head gimbal assemblies 220 are mounted on each arm of a carriage that has a plurality of the arms. FIG. 14 is a side view of the head stack assembly. FIG. 15 is a plan view of the hard disk device. The head stack assembly 250 includes a carriage 251 having a plurality of arms 252. On each of the arms 252, the head gimbal assembly 220 is mounted so that the head gimbal assemblies 220 align with an interval in the vertical direction. At the opposite side of the arm 252 from the carriage 251, the coil 253 is mounted to be a part of the voice coil motor. The voice coil motor has permanent magnets 263 positioned sandwiching the coil 253 and facing each other.

Referring to FIG. 15, the head stack assembly 250 is integrated in the hard disk device. The hard disk device has multiple hard disks 14 mounted on a spindle motor 261. On each of the hard disks 14, two sliders 5 are arranged in a manner of sandwiching the hard disk 14 and facing each other. The head stack assembly 250 except for the thermally-assisted magnetic head 1 and the actuator, corresponding to a positioning device of the present invention, not only support the thermally-assisted magnetic head 1 but also position the thermally-assisted magnetic head 1 with respect to the hard disk 14. The thermally-assisted magnetic head 1 is moved in the track crossing direction of the hard disk 14 by the actuator, and is positioned with respect to the hard disk 14. The magnetic recording element 21 included in the thermally-assisted magnetic head 1 records information to the hard disk 14, and the MR element 7 reproduces the information recorded on the hard disk 14.

While preferred embodiments of the present invention have been shown and described in detail, such description is for illustrative purposes only, and it is to be understood that changes and variations may be made without departing from the spirit or scope of the following claims.

What is claimed is:

1. A thermally-assisted magnetic head that has an air bearing surface (ABS) facing a recording medium and that performs magnetic recording while heating the recording medium, comprising:
   a magnetic recording element that includes a pole of which an edge part is positioned on the ABS and which generates magnetic flux traveling to the recording medium;
   a waveguide that is configured with a core through which light propagates and a cladding, surrounding a periphery of the core, at least one part of which extends to the ABS;
   a plasmon generator that faces a part of the core and that extends toward the ABS side; and
   a bank layer that is positioned between the plasmon generator and the pole, and of which an edge part on the ABS side protrudes relative to the plasmon generator.

2. The thermally-assisted magnetic head according to claim 1, wherein
   an edge part of the plasmon generator on the ABS side is recessed relative to the all other parts on the ABS.

3. The thermally-assisted magnetic head according to claim 1, wherein
   the edge part of the bank layer on the ABS side protrudes relative to the all other parts on the ABS.

4. The thermally-assisted magnetic head according to claim 1, wherein
   an edge part of the plasmon generator on the ABS side is recessed relative to the all other parts on the ABS, and the edge part of the bank layer on the ABS side protrudes relative to the all other parts on the ABS.

5. The thermally-assisted magnetic head according to claim 1, wherein
   the plasmon generator has a V-shaped portion that protrudes toward the core on the ABS;
   the bank layer has a V-shaped portion along the plasmon generator on the ABS; and
   at least a portion of the pole contacting the bank layer is in a reverse-triangle shape along the plasmon generator and the bank layer on the ABS.

6. The thermally-assisted magnetic head according to claim 5, wherein
   a protruding length of the bank layer relative to the plasmon generator is not less than 0.5 nm and not more than 5 nm.

7. The thermally-assisted magnetic head according to claim 6, wherein
   a layer thickness of the bank layer is 1 nm or more.

8. The thermally-assisted magnetic head according to claim 5, wherein
   the plasmon generator includes a propagation edge extending in a longitudinal direction;
   the propagation edge includes an overlapping part that overlaps the core in the longitudinal direction and near-field-generator that faces the core and that is positioned in the vicinity of the edge part of the pole on the ABS;
   the overlapping part of the propagation edge couples to laser light propagating through the core in surface plasmon mode and generates surface plasmon; and
   the propagation edge propagates the surface plasmon generated in the overlapping part to the near-field-generator.

9. The thermally-assisted magnetic head according to claim 1, wherein
   a position of the edge part of the bank layer on the ABS side is closer to the recording medium than a position of the plasmon generator relative to the recording medium.

10. The thermally-assisted magnetic head according to claim 1, wherein
   the bank layer protrudes in a direction perpendicular to the ABS.

* * * * *